Figure 1:
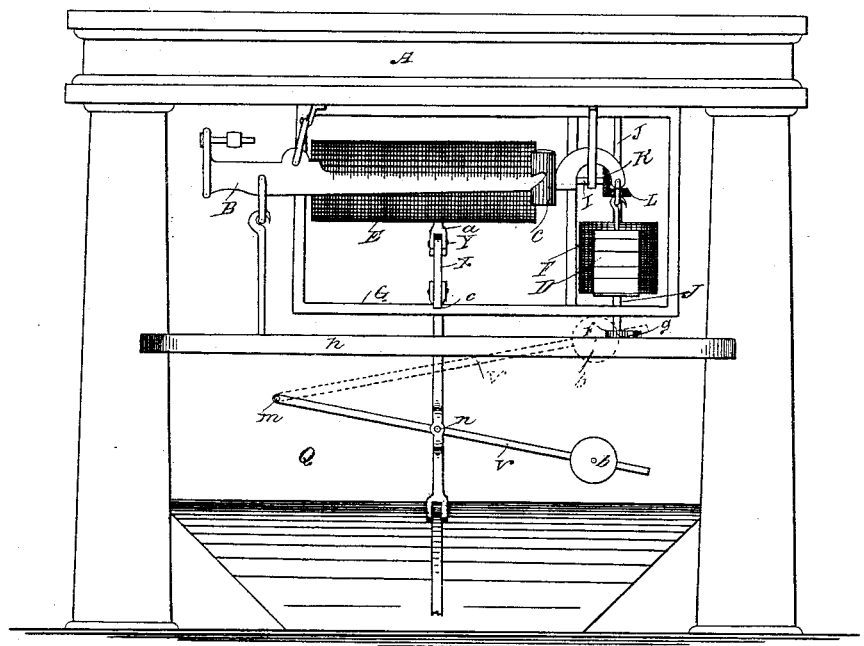

(No Model.)

J. A. JAMIESON.
WEIGHT RECORDER FOR WEIGHING SCALES.

No. 385,310. Patented June 26, 1888.

Witnesses.
J. O'Neil
A. Fitzpatrick

Inventor:
James A. Jamieson,
per: James Laurin
Attorney.

UNITED STATES PATENT OFFICE.

JAMES A. JAMIESON, OF MONTREAL, QUEBEC, CANADA.

WEIGHT-RECORDER FOR WEIGHING-SCALES.

SPECIFICATION forming part of Letters Patent No. 385,310, dated June 26, 1888.

Application filed February 2, 1887. Serial No. 226,308. (No model.) Patented in Canada April 12, 1887, No. 26,441.

*To all whom it may concern:*

Be it known that I, JAMES A. JAMIESON, a citizen of the Dominion of Canada, residing in the city and district of Montreal and Province of Quebec, Canada, have invented certain new and useful Improvements in Automatic Weight-Recorders for Scales, (for which I have obtained a patent, No. 26,441, in the Dominion of Canada, dated April 12, 1887;) and I do hereby declare that the following is a full, clear, and exact description of the same, such as will enable others skilled in the art to which it appertains to make and use the same.

My invention has reference to an automatic weight-recorder for scales, consisting of two cylinders around which is wound a cross-sectioned paper, the weights being provided with needle-points flush with their upper sides, so that when the cylinders approach them automatically the points stick into the papers, thus leaving small holes in the cross-section paper, the holes being placed on the lines representing the weights.

My invention has for its object a rapid and sure way of recording the weight of grain or other objects, and, moreover, the cross-section paper serves as a check for the weigh-man—in fact, relieving him of the trouble of recording each draft, as the section-paper will serve this purpose.

Referring to the drawings, similar letters refer to similar parts throughout the several views.

Figure 3:
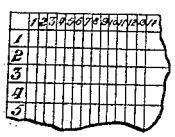
Figure 4:
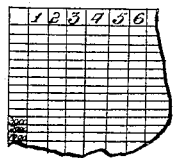
Figure 2:
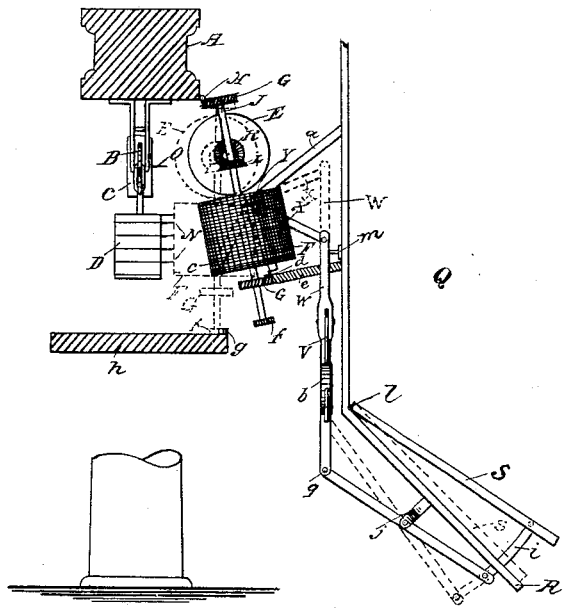

Figure 1 is a front elevation; Fig. 2, an end view; Fig. 3, a sample of the section-paper used on the long cylinder, and Fig. 4 a sample of the section-paper used on the short cylinder.

A is the frame of the scale; B, the beam; C, the ordinary sliding weight, and D the usual weights.

Now, as can be seen on an inspection of the drawings, E is a cylinder placed behind the beam B, and F is a shorter cylinder placed behind the weights D. These two cylinders are kept in position by means of the frame G, the latter oscillating at H. The two shafts I and J of the cylinders E and F are provided with the two bevel-wheels K and L, the latter being exact duplicates of one another, so that when one of the cylinders shall turn a certain distance the other one will turn exactly the same amount.

It can easily be seen by looking at Fig. 2 that when the cylinders are in the position shown in dotted lines E F they come in contact with the small needle-points N, which each weight is provided with, the former being flush with the upper sides of the latter, also with the point O, placed on the sliding weight C, and also that when they are in their normal position, as shown in Fig. 2, they are completely away from the points N and O.

Now the way in which I make the frame G, containing the cylinders E and F, approach and retreat automatically is the following: Suppose the scale is placed in an elevator, as the figures show it, and let Q be the scale-hopper. Now, when the grain falls into the latter, the lever S is pressed down against the inclined portion R of the scale-hopper Q, so that it takes the position shown in dotted line S, and the levers T V and the vertical connecting-piece W, as well as the bell-crank X, take the positions shown in dotted lines by T, V, W, and X, the bell-crank X being hinged at Y on the bracket $a$, which is attached to the scale-hopper Q. On the other hand, the moment all the grain runs out of the hopper Q the counter-weight $b$, placed on the lever V, forces the lever S into its normal position, (shown in the drawings;) but as the end $c$ of the bell-crank X goes outward it catches on the piece $d$ and forces the frame G forward, so that the cylinders E and F come in contact with the points N and O on the weights D and C, so that the position of each of the latter shall be shown on the section-papers; but just at that moment the end $c$ of the bell-crank X slips from the catch $d$, placed on the lower portion of the frame G, (most necessarily the bell-crank X is so proportioned to meet that end,) and at the same time the spring $e$, which is joined to the scale-hopper Q and the frame G, pulls the latter back in its normal position. (Shown in Fig. 2.)

Under the lower portion of the frame G the axis J of the cylinder F is provided with the ratchet-wheel $f$, so that when the frame G is retreating under the influence of the spring $e$ one cog of the ratchet-wheel $f$ butts against the catch $g$, which is fixed to the cross-piece $h$, and forces the cylinder F to turn a certain quantity, and as the latter is joined to the cylinder E by the bevel-wheels K and L, the cylinder E turns exactly the same quantity, thus making my apparatus ready for another draft.

This weight-recorder can be applied to scales weighing not only grain, but all substances permitting a similar arrangement of scale.

The lever S is hinged to the hopper Q at $l$ and attached to the lever T by means of the piece $i$, and the lever T is fulcrumed on the piece $j$; also, the lever V is attached to the hopper Q at $m$ and to the vertical piece W at $n$, the latter being attached to the lever T at $q$ and to the bell-crank X at $p$.

Having described my invention, what I claim, and desire to secure by Letters Patent, is—

1. An automatic weight-recorder for scales, having the frame G, hinged at H and holding the cylinders E and F, the latter being connected through the bevel-wheels K and L and made to turn through the action of the spring $e$, the ratchet-wheel $f$, and the catch $g$, also having the weights C and D, provided with the needle-points O and N, substantially as described, and for the purposes set forth.

2. An automatic weight-recorder for scales, one part of which is made to swing backward and forward automatically—that is, the frame G and the mechanism contained—through the action of the levers S T V, the vertical piece W, and the bell-crank X, whose end $c$ butts against the catch $d$ and the spring $e$, in combination, substantially as described, and for the purposes set forth.

3. The combination of the levers S T V, the vertical piece W, the bell-crank X, and the hopper Q with the frame G, the cylinders E and F, the bevel-wheels K and L, the ratchet-wheel $f$, the catches $d$ and $g$, and the weights D and C, provided with the needle-points N and O, also the spring $e$, substantially as described, and for the purposes set forth.

JAMES A. JAMIESON.

Witnesses:
   I. Z. RESTHER,
   D. DUCHARME.